US010352374B2

(12) United States Patent
Fisher et al.

(10) Patent No.: US 10,352,374 B2
(45) Date of Patent: Jul. 16, 2019

(54) METHOD OF FORMING AND MACHINING A CLUTCH HUB

(71) Applicant: Magna Powertrain, Inc., Concord (CA)

(72) Inventors: Mike Fisher, Newmarket (CA); Peter Heidbuechel, Sharon (CA)

(73) Assignee: MAGNA POWERTRAIN, INC., Concord (CA)

( * ) Notice: Subject to any disclaimer, the term of this patent is extended or adjusted under 35 U.S.C. 154(b) by 204 days.

(21) Appl. No.: 15/252,458

(22) Filed: Aug. 31, 2016

(65) Prior Publication Data

US 2017/0074331 A1 Mar. 16, 2017

Related U.S. Application Data

(60) Provisional application No. 62/218,605, filed on Sep. 15, 2015.

(51) Int. Cl.
*F16D 13/62* (2006.01)
*F16D 13/68* (2006.01)

(52) U.S. Cl.
CPC .... *F16D 13/683* (2013.01); *F16D 2250/0023* (2013.01)

(58) Field of Classification Search
CPC ................................. F16D 2250/00–2250/0092
See application file for complete search history.

(56) References Cited

U.S. PATENT DOCUMENTS

| 4,473,144 A * | 9/1984 | Allori ................... F16D 25/123 188/264 D |
| 4,705,150 A * | 11/1987 | Hill ........................ B21H 5/027 192/70.2 |
| 6,694,791 B1 | 2/2004 | Johnson et al. |
| 6,959,576 B2 | 11/2005 | Hastings et al. |
| 8,636,129 B2 * | 1/2014 | Keating ................ F16D 13/683 192/112 |
| 8,833,124 B2 | 9/2014 | Cripsey et al. |
| 10,047,806 B2 * | 8/2018 | Hodge .................... F16D 41/00 |
| 2013/0256080 A1 * | 10/2013 | Luipold .................. F16D 11/14 192/69.9 |
| 2013/0318792 A1 | 12/2013 | Iwata et al. |
| 2014/0246286 A1 * | 9/2014 | Luipold .................. F16D 41/06 192/41 R |

FOREIGN PATENT DOCUMENTS

| CN | 1773136 A | 5/2006 |
| CN | 1782456 A | 6/2006 |
| CN | 103827529 A | 5/2014 |
| CN | 104032207 A | 9/2014 |

OTHER PUBLICATIONS

Search Report dated Dec. 14, 2018 from corresponding Chinese Patent Application No. 20160825949.4.

* cited by examiner

*Primary Examiner* — Charles A Fox
*Assistant Examiner* — Lillian T Nguyen
(74) *Attorney, Agent, or Firm* — Dickinson Wright PLLC

(57) ABSTRACT

A new method of manufacturing a torque-transmitting clutch component is provided. The method includes coining an interface between a flange segment and a hub segment of the clutch component. Additionally, a torque-transmitting clutch component manufactured by the new manufacturing method is provided.

21 Claims, 8 Drawing Sheets

METHOD OF FORMING AND MACHINING A CLUTCH HUB

CROSS REFERENCE TO RELATED APPLICATIONS

This application claims the benefit of U.S. Provisional Patent Application Ser. No. 62/218,605 filed on Sep. 15, 2015, and titled "METHOD OF FORMING AND MACHINING A CLUTCH HUB", the entire disclosure of which is hereby incorporated by reference.

FIELD

The present disclosure relates generally to a new method of manufacturing torque-transmitting splined components and improved torque-transmitting splined components manufactured in accordance with this new method. More particularly, the present disclosure relates to clutch components, such as clutch hubs and clutch drums, manufactured using a draw forming process, a roller die spline forming process, and a coining operation all of which are capable of being sequentially provided in a transfer press unit.

BACKGROUND

This section provides background information related to the present disclosure which is not necessarily prior art.

Power transfer devices of the type used in automotive applications, such as for example, automatic transmissions, torque couplings, power take-off units and transfer cases, are commonly equipped with a power-operated multi-plate clutch assembly. Typically, the multi-plate clutch assembly includes a first clutch member (such as a clutch hub) driven by an input component, a second clutch member (such as a clutch drum) driving an output component, a multi-plate clutch pack disposed therebetween, and a powered clutch actuator for engaging the clutch pack and transmitting drive torque from the clutch hub to the clutch drum. The clutch drum and clutch hub are typically annular components having torque-transmitting spline teeth that are configured to engage and mesh with corresponding clutch teeth formed on the clutch plates of the clutch pack.

To reduce the mass of such clutch members while maintaining the required high-strength and torque transmission characteristics, many modern clutch hubs and drums, hereinafter referred to cumulatively as annular clutch components, are formed from sheet-metal blanks using a combination of various metal-forming and metal-cutting processes. Non-limiting examples of current high volume processes for manufacturing annular clutch components include Grob spline processing and flow form processing.

Due to the design of these formed sheet-metal clutch components, the currently available processes also present several known shortcomings. Specifically, the annular clutch components are initially formed from a steel blank that is drawn into a cup-shaped component having a radial plate segment and an axially-extending hub segment. The cup-shaped component is subsequently formed over a mandrel to produce a spline form in the hub segment via the Grob splining process. The start of the spline form from the flat flange segment to the outer diameter is in the form of a radius with a large radius on the major OD and a smaller radius on the minor OD. Typically, the annular clutch component requires an additional metal-cutting or machining process after forming the splines to form a mounting segment on the plate segment configured to allow subsequent welding or joining of another torque transmitting component. In order to guarantee the flatness of the plate segment of the annular clutch component, a metal-cutting machining process is also typically required. However, machining of the plate segment requires the cutter tool to cut along the entire length of the plate segment and encounter the edge of the spline form on both the major and minor OD surfaces. This "cut" edge profile results in an interrupted cut which, in turn, causes the machined edge material to be pushed down into the spline form as a burr. As such, a subsequent deburring operation is required to remove the burrs in the spline form area. Burrs that are not removed prior to assembly of the clutch assembly can have a detrimental impact on the function and service life of the clutch assembly.

To this end, a need exists to develop a metal forming process capable of forming an annular clutch component which is an advancement over conventional cold forming (Grob spline forming) processes.

SUMMARY

This section provides a general summary of the present disclosure, and is not intended to be interpreted as a comprehensive listing of all of its aspects, features, advantages and objectives.

It is an aspect of the present disclosure to provide a method of manufacturing a high strength torque-transmitting component using a combination of metal forming operations and which is a superior solution to current draw formed, Grob spline formed and machined components.

It is another aspect of the present disclosure to provide a method of manufacturing a high strength torque-transmitting clutch component for use in a multi-plate clutch (or brake) assembly.

It is a further aspect of the present disclosure to provide an improved method that results in a non-interrupted (i.e., non-cut) spline form edge profile so as to eliminate the creation of burrs associated with conventional interrupted cut spline forms and the requirement for subsequent de-burring operations.

A further aspect is to produce finished parts using press tooling at higher output rates in comparison to standard cold forming (Ernst Grob) processing.

It is another aspect to provide a simplified component design, eliminate costly de-burring operations, reducing additional machining requirements, as well as using coined features as a datum for subsequent welding operations.

According to these and other aspects of the disclosure, a splined annular clutch component is provided. The splined annular clutch component includes a radial flange segment. An axially-extending hub segment is integrally coupled to the radial flange segment at an edge interface. Splines are roll formed into an external surface of the hub segment from an open free end to the edge interface. The edge interface is coined via a coining process following completion of the spline forming operation to provide a burr-less coined interface.

According to another aspect of the disclosure, an annular clutch hub is provided. The annular clutch hub includes a flange segment that generally has a disc-shape. The flange segment extends about a central aperture and a center axis, and terminates radially outwardly at an edge region. A hub segment that generally has a tube shape extends from the edge region of the flange segment to define an interface between the flange segment and the hub segment. The hub segment extends axially from the interface to an open end.

A plurality of roll-formed splines are defined along the hub segment, each extending axially from the interface to the open end and circumferentially spaced from one another. The splines are created by a roll-forming process. A first coined interface area is defined at the interface between the flange segment and the hub segment. The first coined interface area extends circumferentially about the axis. The first coined interface area is formed via a coining process to provide a burr-less coined interface between the flange segment and the hub segment.

According to yet another aspect of the disclosure, a method of manufacturing a torque-transmitting clutch is provided. The method includes drawing a sheet-metal blank into a cup-shaped preform having a radial flange segment and an axial hub segment. After the preform is formed, a plurality of spline forms are rolled into the hub segment. The method further includes trimming and forming a chamfer in an end portion of the hub segment. Furthermore, the method includes coining an interface between the flange segment and the hub segment. The coining of the interface creates a first coined interface area that provided a non-interrupted edge profile to the end of the spline forms.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts and/or sub-assemblies throughout the several views of the drawings.

DETAILED DESCRIPTION

Figure 1:
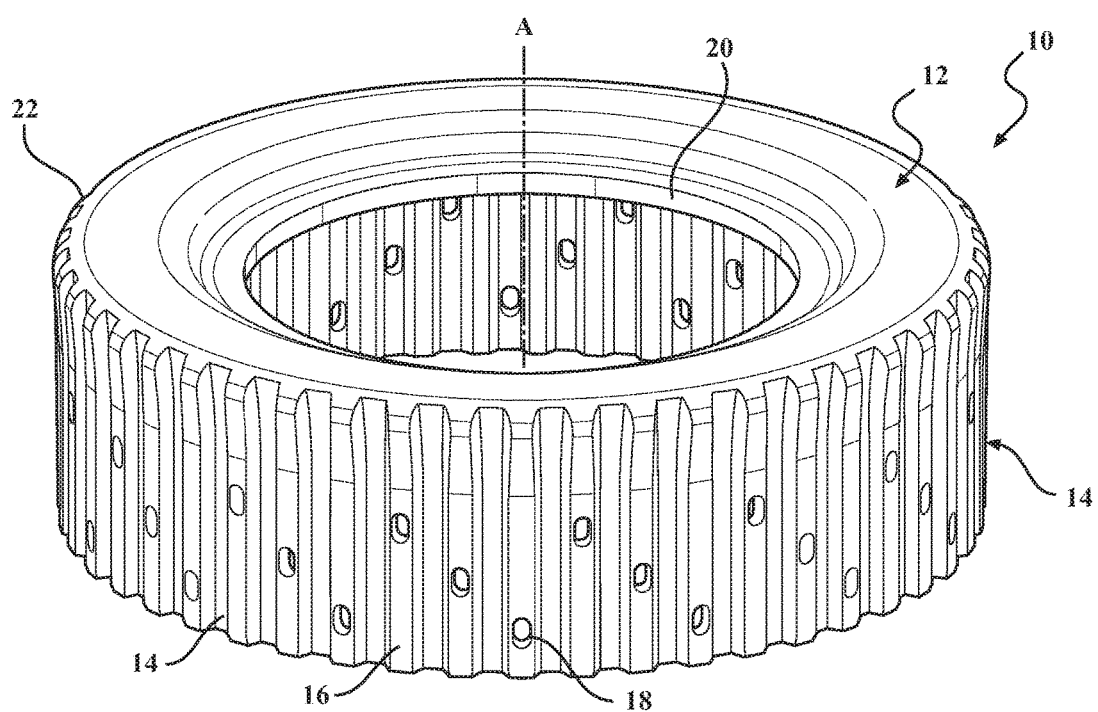
FIG. 1 is an isometric view of a conventional clutch hub of the type used in a multi-plate clutch assembly and manufactured from a drawn cup-shaped preform using a Grob spline forming process and which is shown in a "pre-machined" condition.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In general, the teachings of the present disclosure are directed toward a method of manufacturing an annular clutch component from a blank of steel and which is capable of providing non-machined straight formed splines. The method further includes a coining operation with such being adapted for use in a multi-station (i.e. transfer press) forming operation. The present disclosure further relates to an annular clutch component fabricated using this new part forming process. In a preferred embodiment, the annular clutch component is a clutch hub of a multi-plate friction clutch assembly for use in vehicular drivetrain applications which may include, without limitations, automatic transmissions, transfer cases, power take-off units, torque couplings and disconnect couplings. Specifically, the present disclosure provides a manufacturing process directed to reducing burrs and/or post process deburring requirements on torque-transmitting clutch components by utilizing a metal forming process (such as press deep drawing or cold forming) which replaces the conventional cold working/forming (i.e., Grob spline) with a high tonnage transfer press allowing for cost optimization.

Figure 2:
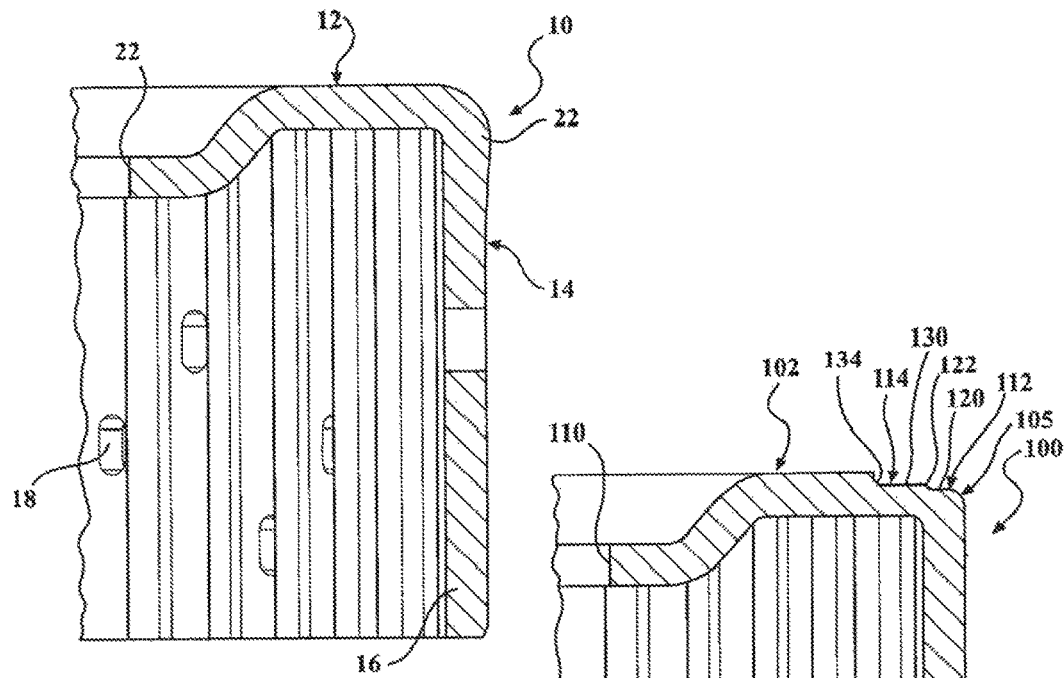
FIG. 2 is a partial sectional view of the clutch hub shown in FIG. 1 showing the Grob spline form in the as-formed pre-machined condition.
Figure 5:
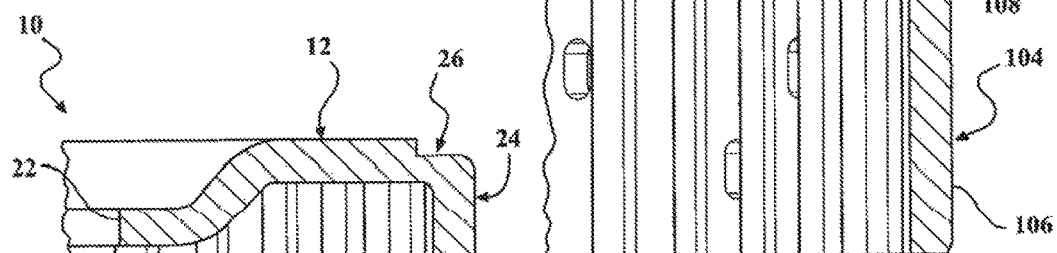
FIG. 5 is a partial sectional view of FIG. 4 illustrating the improved clutch hub having a non-machined straight formed spline feature, a coined edge feature, and a subsequently coined or machined mounting feature associated with the present disclosure.
Figure 3:
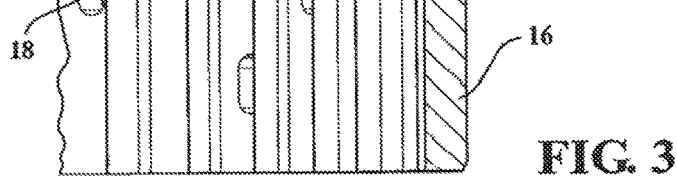
FIG. 3 is a partial sectional view, similar to FIG. 2, showing subsequent metal-cutting machining operations which results in the disadvantages mentioned in the Background section.

FIGS. 1 through 3 illustrate a conventional (prior art) clutch component, hereinafter annular clutch component 10, having a radial plate or flange segment 12 and axial hub segment 14 while together define a cup-shaped member formed by a cold-forming operation. The cup-shaped member is subsequently exposed to a spline forming process, commonly referred to as Grob splining, to form a set of circumferentially-aligned spline forms 16, i.e., "splines", in axial hub segment 14. Subsequently, a trim and slotting operation is conducted to pierce a plurality of oil transfer holes 18 and to properly size an aperture 20 formed in radial flange segment 12. Annular clutch component 10 is shown in FIG. 2 following these initial operations. A known shortcoming of the Grob splining process is located at the outer radius profile at an interface 22 of radial flange segment 12 and axial hub segment 14. This profile requires subsequent machining (i.e. a metal cutting operation) as shown in FIG. 3 to remove material and provided machined straight splines 24 and a machined step 26 for subsequent laser welding of additional drive/driven component. The machining operation for the straight splines 24 is known to result in burrs that must be removed via a de-burring operation. The above-noted description is an abbreviated disclosure of a well-known and commercially successful method for manufacturing metal-formed clutch hubs with splines 16 sized and configured to mesh with internal clutch teeth formed on clutch plates of the multi-plate clutch pack. Such "prior art" clutch hubs are satisfactory for their intended purposes. However, the following detailed disclosure of an alternative manufacturing method is intended to eliminate the spline machining and step machining operations, as well as to eliminate post de-burring requirements.

Figure 4:
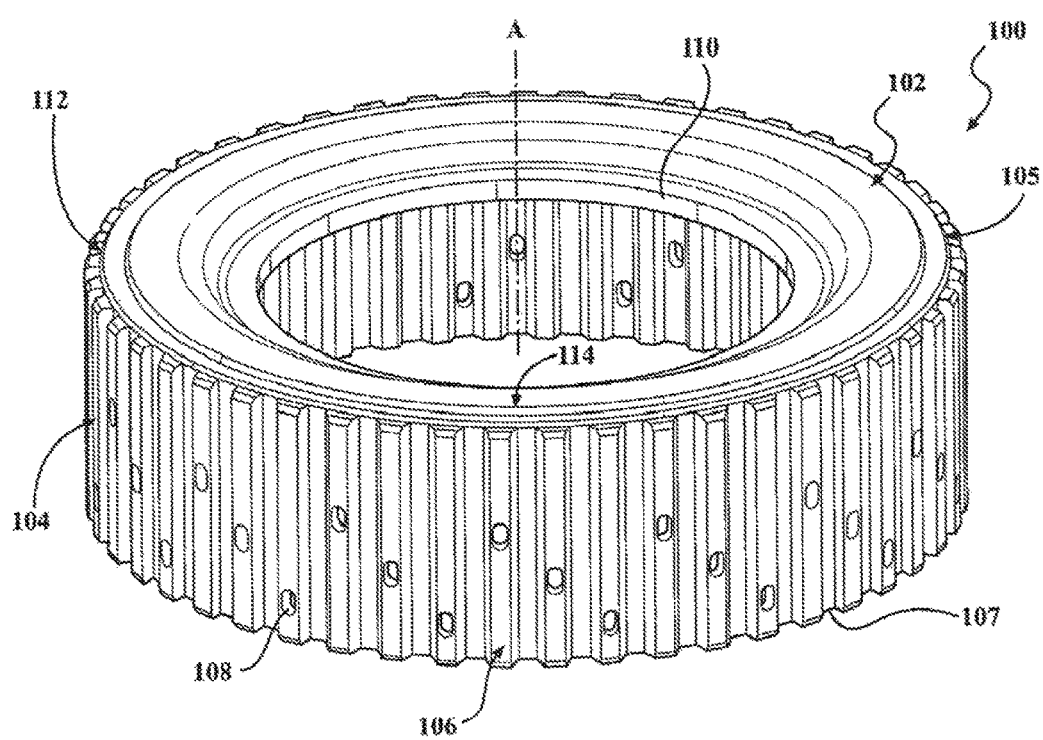
FIG. 4 is an isometric view of a clutch hub manufactured using a new forming process embodying the teachings of the present disclosure.
Figure 8:
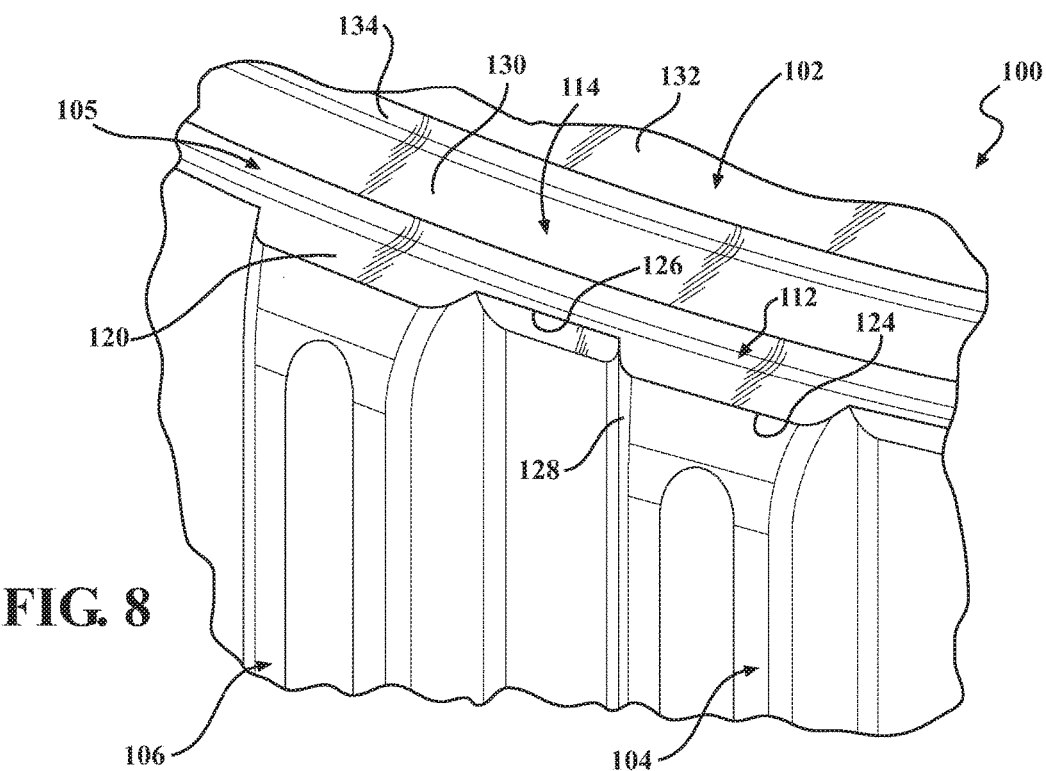
FIG. 8 is similar to FIG. 6 but illustrates the subsequent machining operation following the coining operation.
Figure 9:
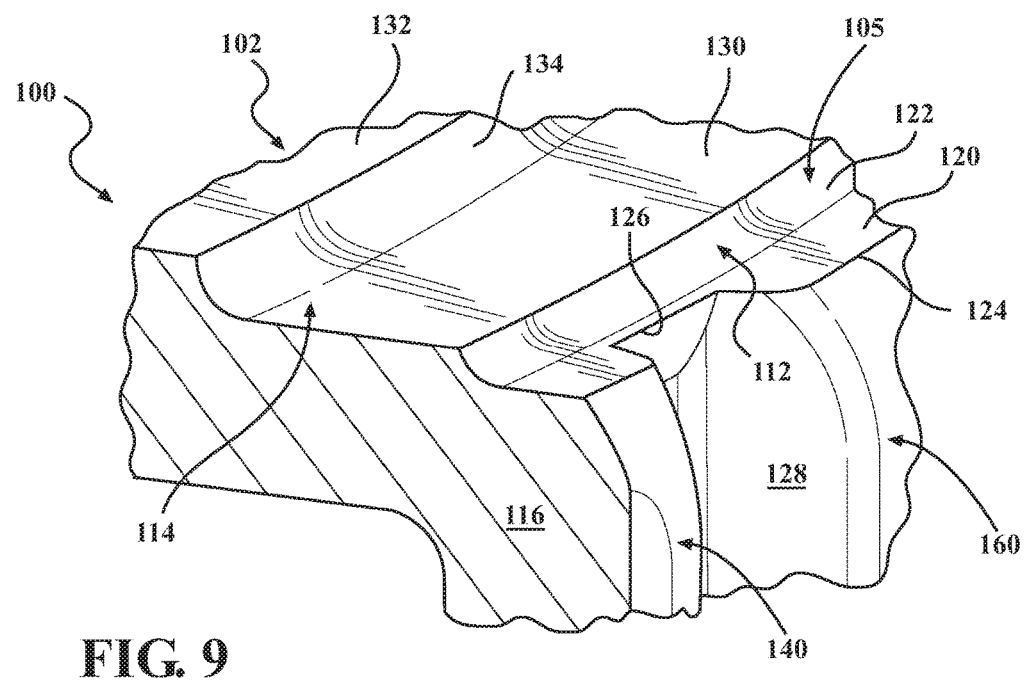
FIG. 9 is similar to FIG. 7 and is an enlarged sectional view of FIG. 8 which further illustrates the machining operation.
Figure 10:
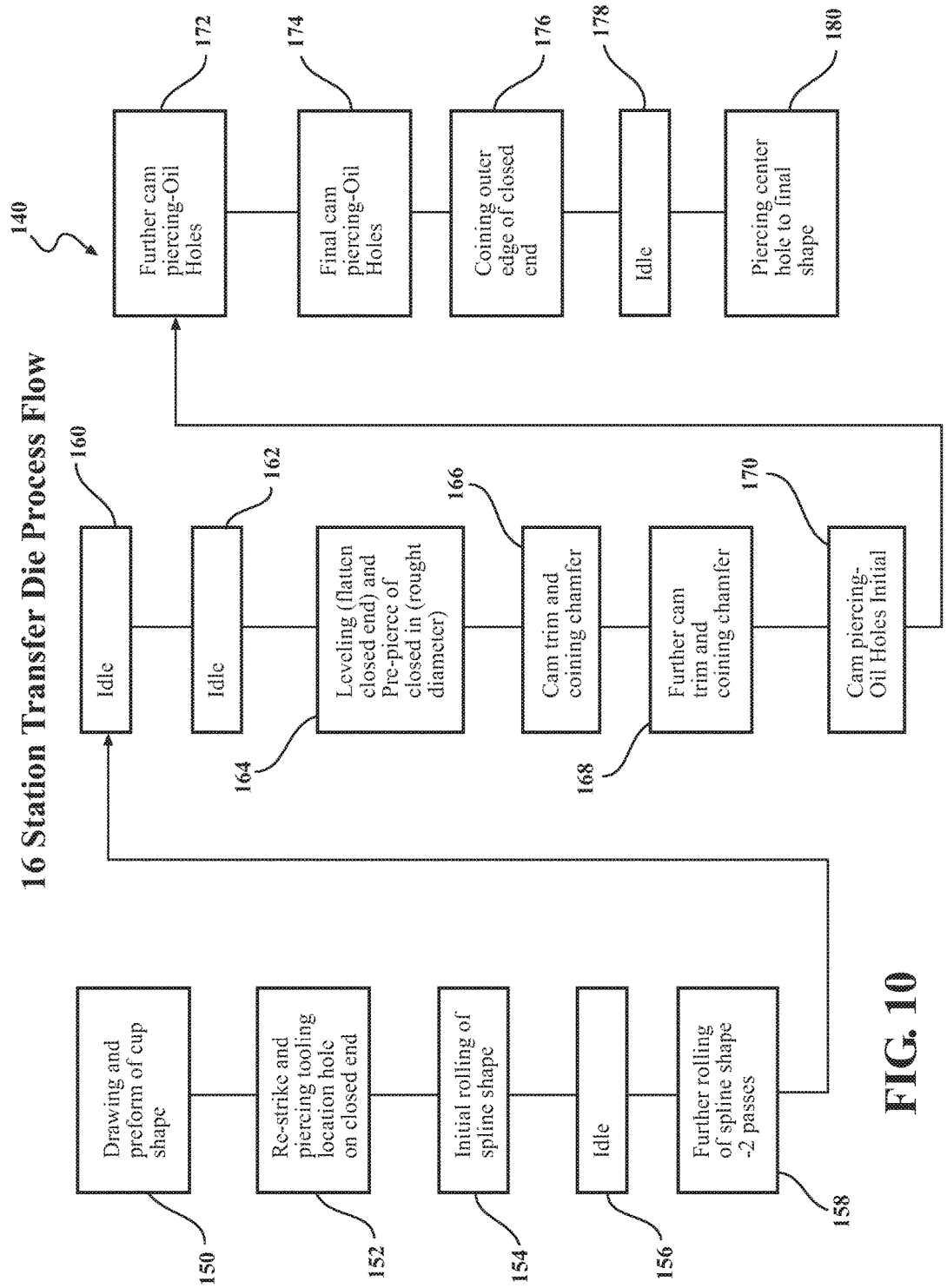
FIG. 10 is a process flow chart listing the manufacturing steps and/or operations for manufacturing the clutch hub of the present disclosure in a multi-station transfer press.
Figure 11:
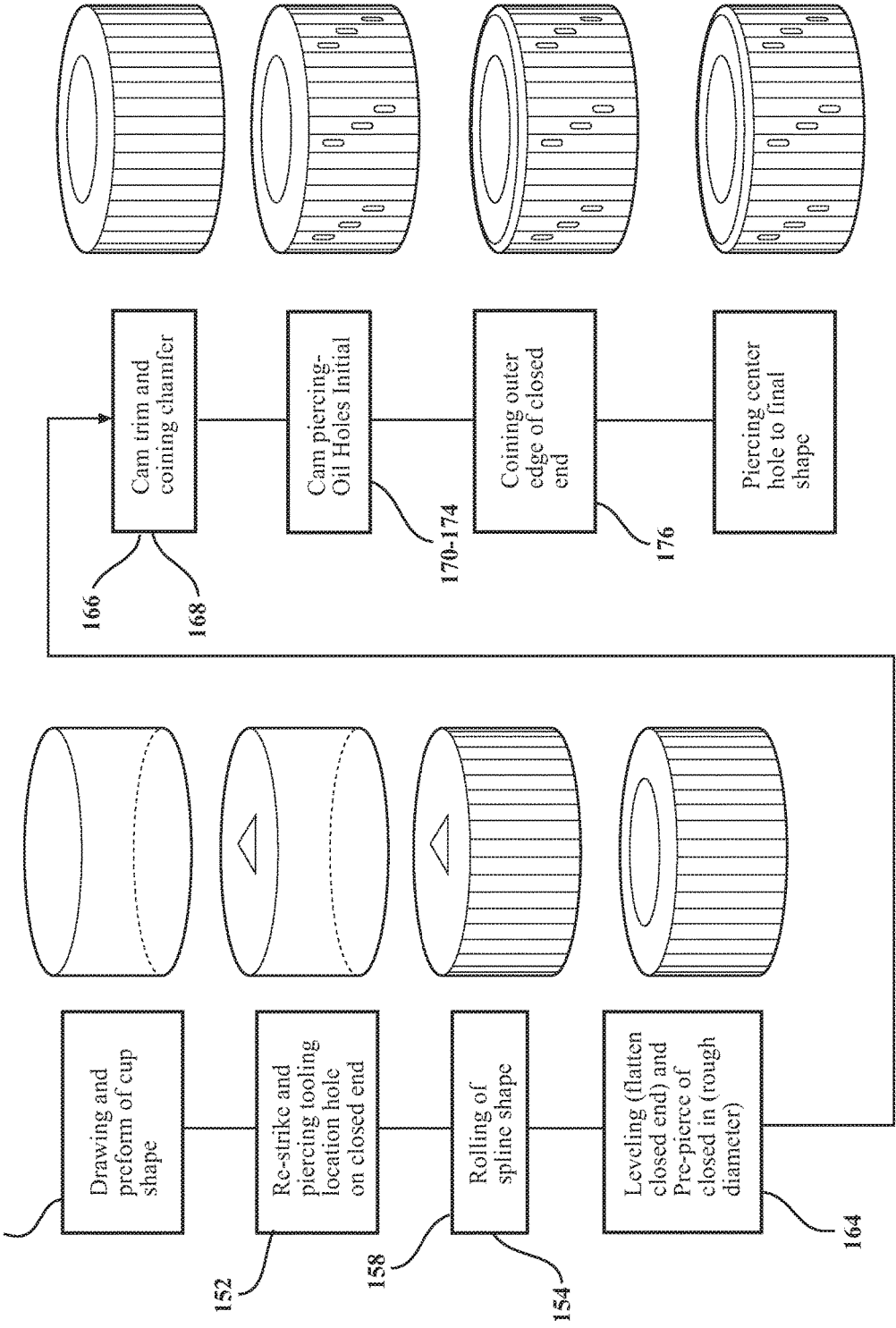
FIG. 11 is a simplified/illustrative view of the transfer die process flow chart of FIG. 10.

To this end, FIGS. 4 through 9 illustrate various features of an improved annular clutch component 100 manufactured in accordance with a new method that is diagrammatically disclosed with reference to FIGS. 10 and 11. In particular, FIG. 4 shows annular clutch component 100 to include a cup-shaped member that is disposed about a center axis A and has a radial flange segment 102 and an axially-extending hub segment 104. The radial flange segment 102 and hub segment meet at an interface 105. The hub segment extends from the interface 105 to an open end 107. The cup-shaped pre-form (formed in a drawing operation) is subsequently exposed to roller dies to form a continuous series of circumferentially-aligned spline forms 106 on hub segment 104. As seen, oil transfer holes 108 and a central aperture 110 are also provided. In accordance with the present disclosures, a multi-station transfer press is used to output a finished part including non-cut straight spline forms 106 (formed via rolling and flattening operations) and a coined area 112 (formed via a coining operation). A subsequent second coining operation or a machining operation provide a second coined/machined area 114 configured to permit joining (i.e. welding) of a drive/driven component to clutch component 100.

Figure 6:
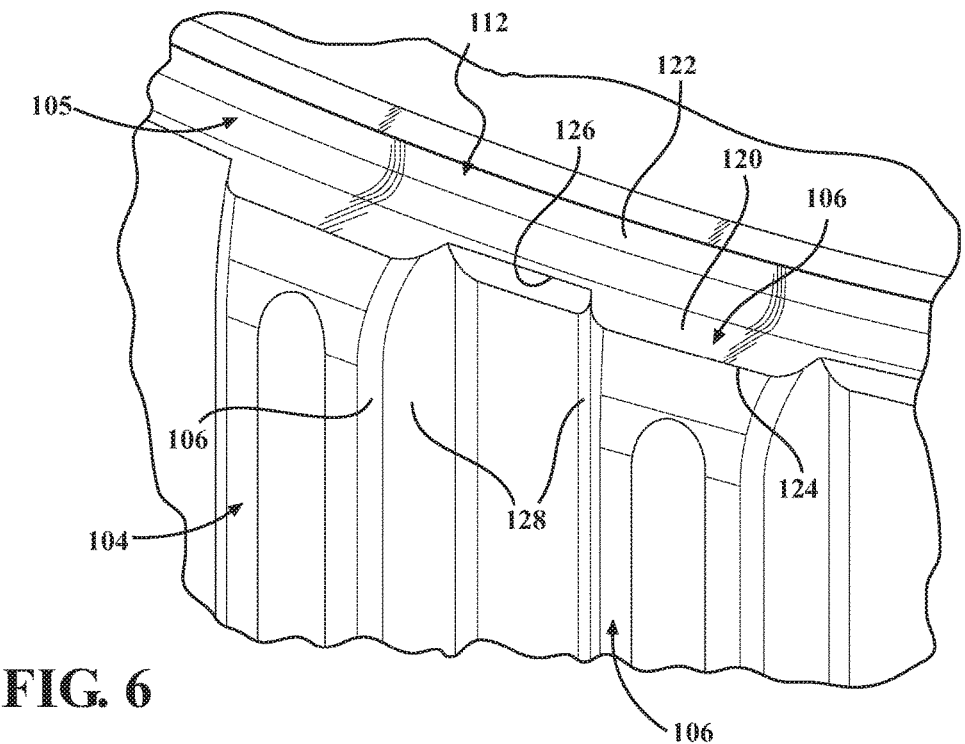
FIG. 6 is a partial enlarged view of the clutch hub shown in FIG. 4 to better illustrate the straight formed spline feature and the coined feature.
Figure 7:
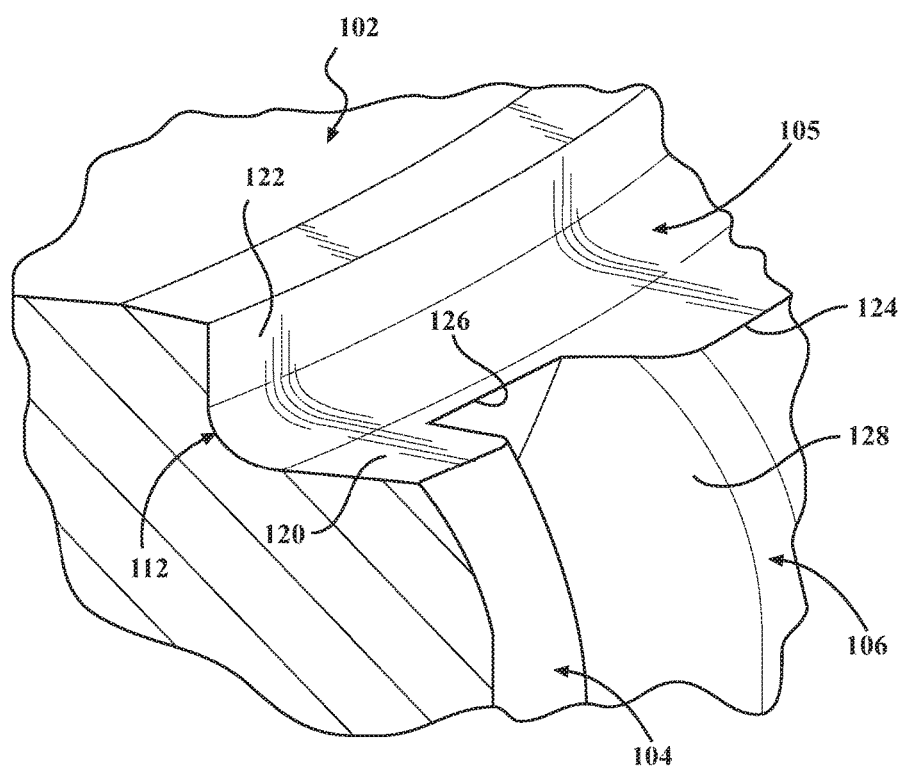
FIG. 7 is a further enlarged and sectional view of FIG. 6 provided to further illustrate the coined area and the non-burred spline form.

Referring to FIGS. 6 and 7, clutch component 100 is shown following the spline roll forming operation and the coining operation. Coined area 112 defines a circular edge segment 120 and a shoulder segment 122. As is well-known, the coining operation is a metal deformation process and not a metal cutting process. The coined profile shows displacement of the material of the edge radius into the outside major diameter so as to create a stepped profile. As such, a "non-interrupted" interface is established between edge segment 120 and the end profile of each of the spline forms 106. Each spline form 106 includes a major diameter surface 124, a minor diameter surface 126, and a pair of side surfaces 128. Since this is a non-interrupted (i.e. non-cut) interface, no concerns with the creation or existence of burrs exist.

FIGS. 8 and 9 are similar to FIGS. 6 and 7 but show a subsequent operation following the edge coining process. This subsequent operation can be either of a machining (metal removal) operation or a second coining (metal deformation) operation and is solely provided to establish a mounting area 114 having a mounting surface 130 on radial flange segment 102 to which the additional component is welded. Mounting surface 130 is connected to flattened surface 132 of radial flange segment 102 via a shoulder surface 134. If machining is used, it is noted that the cutter does not cut across the spline form; hence no burrs are pulled into spline forms 106. As illustrated in the figures, the shoulder segment 122 and shoulder surface 134 may each generally have an arc-shape along at least a portion thereof. It should be appreciated that the radius of the arc may vary.

Referring now to FIG. 10, an example of one non-limiting version process flowchart for a multi-station transfer press 140 is shown for identifying a sequence of manufacturing operations used for manufacture clutch component 100. A first step or operation, identified by block 150, provides the operation within transfer press 140 utilized to draw a blank of steel into the cup-shaped preform. A second step or operation, identified by block 152, defines the operation within transfer press 140 to re-strike the cup-shaped preform and pierce a locator hole in radial flange segment 102. In the next operation or step, identified by block 154, a first or initial roller die operation is performed to form the spline forms in hub segment 104. While not required, an idle step or station, identified by block 156, is provided after the initial spline rolling operation 154. Block 158 indicates further rolling of the spline forms on hub segment 104. Additional idle stations 160, 162 are thereafter provided.

Upon completion of the spline rolling operation(s), a leveling or flattening a metal-forming operation is provided, as indicated by block 164, for flattening surface 132 of radial flange segment 102 and piercing aperture 110 to its rough diameter. Block 166 indicates the step or operation of trimming and coining the open end edge surface of axial hub segment 104. Block 168 indicates a supplemental (optional) trimming and coining operation to augment the operations identified by block 166. Blocks 170-174 are indicative of the sequential steps or operations provided in transfer press 140 for piercing oil transfer holes 108. Coined area 112 is formed via the coining operation provided by block 176. Following this coining operation and a possible idle station 178, aperture 110 in flange segment 102 is pierced to its final shape and size in an operation identified by block 180. The second coining operation for forming mounting area 114, i.e., the second coined/machined area 114, can also be provided in transfer press 140. For additional clarity, FIG. 11 illustrates the various formed configurations of clutch component 100 provided during the sequential operations associated with transfer press 140.

Figure 12:
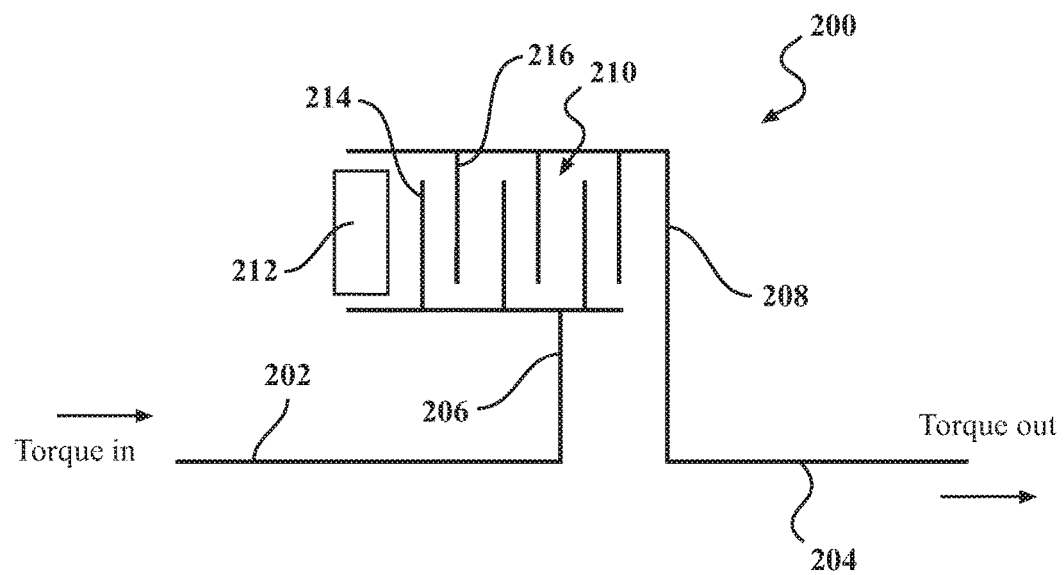
FIGS. 12 and 13 are schematic views of a clutch assembly equipped with one or more annular clutch components manufactured in accordance with the teachings of the present disclosure.

Referring to FIG. 12, a rudimentary schematic illustration of a multi-plate friction clutch assembly 200 is shown disposed between a rotary input component 202 and a rotary output component 204. Clutch assembly 200 includes a clutch hub 206 driven by input component 202, a clutch drum 208 driving output component 204, a clutch pack 210, and a power-operated clutch actuator 212. Clutch pack 210 includes inner clutch plates 214 coupled via splines to clutch hub 206 and outer clutch plates 216 coupled via splines to clutch drum 208. Clutch actuator 212 applies an engagement force to clutch pack 210 to transfer drive torque from input component 202 to output component 204. It is contemplated that at least clutch hub 206 (and possibly clutch drum 208) is manufactured using the method of the present disclosure.

Figure 13:
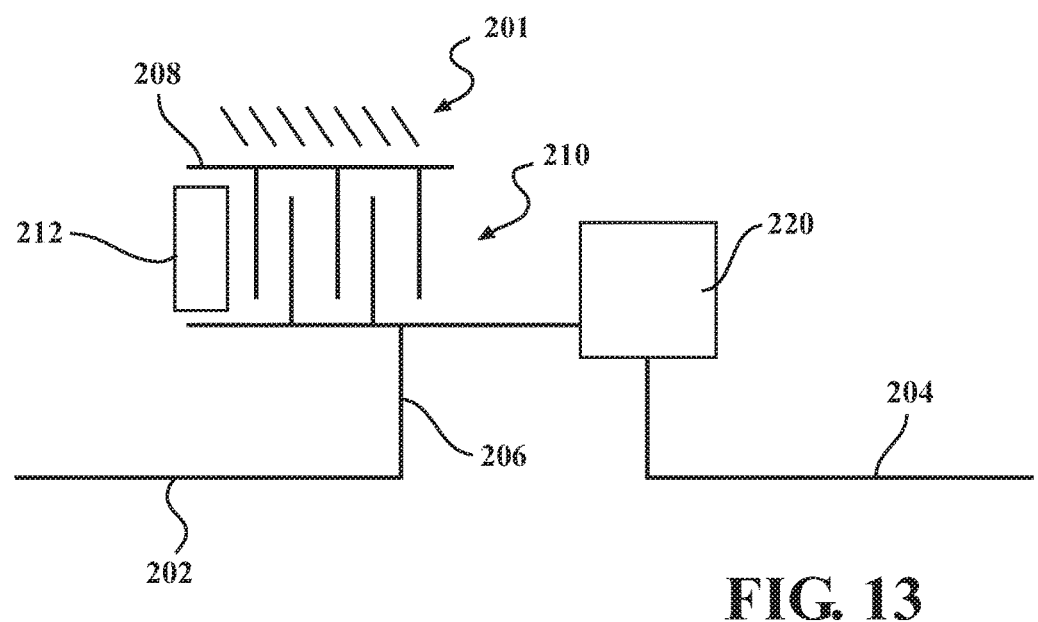

FIG. 13 is a rudimentary schematic illustration of friction clutch assembly 200 being used as a power-operated brake device, possibly as part of an automatic transmission. As shown, clutch drum 208 is now a stationary member, while clutch hub 206 is coupled to a component of a planetary gearset 220. As is known, released and braked operation of friction clutch 200 functions to provide a pair of speed ratio outputs to output component 204 through planetary gearset 220.

The purpose of illustrating these potential uses of clutch components of the present disclosure is to permit those skilled in the art to appreciate that these rolled splined annular clutch components are adapted for a plethora of automotive and non-automotive torque transmission applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a torque-transmitting clutch component comprises the steps of:
   drawing a sheet-metal blank into a cup-shaped preform having a radial flange segment and an axial hub segment;
   rolling a plurality of spline forms into the hub segment;
   trimming and forming a chamfer in an end portion of the hub segment; and
   coining an interface between the flange segment and the hub segment;
   wherein the coining of the interface creates a first coined interface area that provided a non-interrupted edge profile to the end of the spline forms.

2. The method as recited in claim 1, comprising:
   the radial flange segment; and
   the axially-extending hub segment integrally coupled to the radial flange segment at an edge interface;
   wherein splines are roll formed into the hub segment and extend from an open free end to the edge interface,
   wherein the edge interface is coined via the coining process following completion of the spline forming operation to provide a burr-less coined interface,
   wherein the coined interface includes an edge segment that is substantially planar and terminates at the splines, and a shoulder segment that extends upwardly from the edge segment.

3. The method as set forth in claim 2 further including a second coined area defined by the radial flange segment radially inward from the coined interface, wherein the second coined area is coined via a second coining process following completion of the coined interface.

4. The method as set forth in claim 3 wherein the second coined area includes a shoulder surface and a mounting surface, wherein the shoulder surface is spaced from the coin interface, and the mounting surface is generally planar and extends between the coined interface and the shoulder surface.

5. The method as set forth in claim 2 wherein the hub segment defines a plurality of oil transfer holes.

6. The method as set forth in claim 2 further comprising a mounting area formed on the radial flange segment radially inward from the coined interface, wherein the mounting area is machined via a machining operation following completion of the coining process.

7. The method as recited in claim 1, comprising:
   the flange segment generally having a disc-shape and extending about a central aperture and a center axis, and terminating radially outwardly at an edge;
   the hub segment generally having a tube shape and extending from the edge of the flange segment to define an interface between the flange segment and the hub segment, and wherein the hub segment extends axially from the interface to an open end;
   the plurality of roll-formed splines along the hub segment, each extending axially from the interface to the open end, wherein the splines are created by the roll-forming process, and wherein the splines are circumferentially spaced from one another about the hub segment; and
   the first coined interface area defined at the interface between the flange segment and the hub segment, wherein the first coined interface area extends circumferentially about the axis, wherein the first coined interface area is formed via the coining process to provide a burr-less coined interface between the flange segment and the hub segment, and wherein the first coined interface area has an edge segment extending generally perpendicularly to the center axis and a shoulder segment extending upwardly from the edge segment.

8. The method as set forth in claim 7 further including a second coined area defined radially inwardly from the first coined interface area on the flange segment, wherein the second coined area is coined via a second coining process following completion of the first coined interface area.

9. The method as set forth in claim 8 wherein the second coined area includes a shoulder surface and a mounting surface, wherein the mounting surface is generally planar, the shoulder surface extends upwardly from the mounting surface, and wherein the mounting surface is disposed between the shoulder surface and the first coined interface area.

10. The method as set forth in claim 9 wherein the shoulder segment of the first coined interface area and the shoulder surface of the second coined area each generally have an arc shape.

11. The method as set forth in claim 9 wherein a flattened surface extends radially inwardly from the shoulder surface of the second coined area, and wherein the flattened surface is generally planar and extends generally perpendicularly to the center axis.

12. The method as set forth in claim 7 wherein the hub segment defines a plurality of oil transfer holes.

13. The method as set forth in claim 7 wherein each of the splines extends radially outwardly to a major diameter at a terminal edge and has a pair of side surfaces being generally perpendicular to the terminal edge.

14. The method as set forth in claim 7 further including a mounting area located between the first coined interface area and the flange segment, wherein the mounting area is formed via a machining process following the coining process.

15. The method as recited in claim 1, comprising: an annular clutch hub formed from the sheet-metal blank including the flange segment and the hub segment, the flange segment having a disc-shape with a central aperture extending about a center axis and terminating radially outwardly at an edge, the hub segment generally having a tube shape and extending from the edge of the flange segment to define an interface between the flange segment and the hub segment, and wherein the hub segment extends axially from the interface to an open end;
the plurality of splines along the hub segment, each spline extending axially from the interface to the open end and being circumferentially spaced from one another; and a deformed interface area defined at the interface between the flange segment and the hub segment, wherein the deformed interface area is established via a deformation process following completion of the spline forming operation to provide a burr-less deformed interface, wherein the deformed interface area is established via the deformation process including the coining process, and wherein the deformed interface area defines a first deformed area having an edge segment extending generally perpendicularly to the center axis and a shoulder segment extending upwardly from the edge segment.

16. The method as set forth in claim 15 further including a second deformed area defined radially inwardly from the first deformed area on the flange segment, wherein the second deformed area is established via a second deforming process following completion of the first deformed area.

17. The method as set forth in claim 16 wherein the second deformed area is established via the deformation process including the coining process.

18. The method as set forth in claim 15 wherein the hub segment defines a plurality of oil transfer holes.

19. The method as set forth in claim 18 wherein at least two of the circumferentially adjacent splines each include includes at least one of the plurality of oil transfer holes, and wherein the oil transfer holes in the circumferentially adjacent splines are offset from one another along a direction of the central axis.

20. The method as set forth in claim 15 further including a mounting area formed radially inwardly from the first deformed area on the flange segment, wherein the mounting area is established via a machining process following completion of the coining process.

21. The method as recited in claim 1, comprising:
a radial flange segment;
an axially-extending hub segment integrally coupled to the radial flange segment at an edge interface; and
splines roll formed onto the hub segment and which extend from an open free end to the edge interface, wherein the edge interface is coined via a first coining process following completion of a spline roll forming operation to provide a first coined area, and wherein a second coined area is formed via a second coining process following completion of the first coining process.

* * * * *